(12) United States Patent
Daykin

(10) Patent No.: US 10,344,789 B2
(45) Date of Patent: Jul. 9, 2019

(54) SELF-DRILLING DRYWALL ANCHOR AND A METHOD OF SECURING AN ANCHOR IN A DRYWALL

(71) Applicant: UK Building Products LTD, Westbury, Wiltshire (GB)

(72) Inventor: Jordan Andrew Daykin, Trowbridge (GB)

(73) Assignee: U.K. BUILDING PRODUCTS LTD., Wiltshire (GB)

( * ) Notice: Subject to any disclaimer, the term of this patent is extended or adjusted under 35 U.S.C. 154(b) by 116 days.

(21) Appl. No.: 15/596,964

(22) Filed: May 16, 2017

(65) Prior Publication Data

US 2017/0343025 A1 Nov. 30, 2017

(30) Foreign Application Priority Data

May 26, 2016 (GB) .................................. 1609327.0

(51) Int. Cl.
*F16B 33/04* (2006.01)
*F16B 13/00* (2006.01)
(Continued)

(52) U.S. Cl.
CPC ............ *F16B 13/002* (2013.01); *F16B 31/02* (2013.01); *F16B 31/027* (2013.01); *F16B 37/127* (2013.01); *F16B 33/002* (2013.01)

(58) Field of Classification Search
USPC ................................................. 411/1–3, 6, 7
See application file for complete search history.

(56) References Cited

U.S. PATENT DOCUMENTS 3,709,087 A * 1/1973 Stone, Jr. ................ F16B 31/02
411/6
4,176,582 A * 12/1979 Witte ....................... F16B 31/02
411/7
(Continued)

FOREIGN PATENT DOCUMENTS

EP 0425358 2/1991

*Primary Examiner* — Gary W Estremsky
(74) *Attorney, Agent, or Firm* — Crose Law LLC; Bradley D. Crose

(57) ABSTRACT

Inexperienced users of conventional self-drilling drywall anchors may apply too much torque to its screw drive, even after the anchor has become fully bedded down in the drywall, under the mistaken impression that applying a greater torque will improve security of the anchor within the drywall. However, continuing to rotate the anchor after it has been fully inserted into the dry wall continues to rotate the anchor within the drywall and gouges out drywall material from around the anchor. Such gouging causes a cavity to form around the anchor, reducing its security within the wall. The present invention provides a self-drilling drywall anchor having a screw drive 16 that comprises a clutch configured to limit an amount of torque transmitted to the shank 5 by a tool engaged with the screw drive 16. In this way, a user may drive the anchor into a drywall, but over-tightening is prevented as the clutch limits the amount of torque transmitted to the shank 5, thereby preventing the external threads 7 on the shank from gouging out drywall material adjacent to the anchor and reducing the anchor's security within the drywall.

5 Claims, 7 Drawing Sheets

(51) Int. Cl.
F16B 31/02 (2006.01)
F16B 37/12 (2006.01)
F16B 33/00 (2006.01)

(56) References Cited

U.S. PATENT DOCUMENTS

| | | | | | |
|---|---|---|---|---|---|
| 4,892,429 | A | * | 1/1990 | Giannuzzi | E04D 3/3603 411/383 |
| 5,039,262 | A | * | 8/1991 | Giannuzzi | E04D 3/3603 411/178 |
| 5,160,225 | A | * | 11/1992 | Chern | F16B 13/002 408/203.5 |
| 5,308,203 | A | * | 5/1994 | McSherry | F16B 13/002 411/31 |
| 5,536,121 | A | * | 7/1996 | McSherry | F16B 13/002 411/31 |
| 5,752,792 | A | * | 5/1998 | McSherry | F16B 13/002 411/31 |
| 5,795,116 | A | * | 8/1998 | Frank | F16B 31/02 411/1 |
| 5,833,415 | A | * | 11/1998 | McSherry | F16B 13/002 411/31 |
| 6,364,688 | B1 | * | 4/2002 | Fraley, II | H01R 13/639 411/353 |
| 6,802,680 | B1 | * | 10/2004 | Rubenstein | F16B 31/021 411/383 |
| 7,266,874 | B2 | * | 9/2007 | Ernst | F16B 13/002 29/432 |
| 2011/0236153 | A1 | | 9/2011 | Kuenkel et al. | |

* cited by examiner

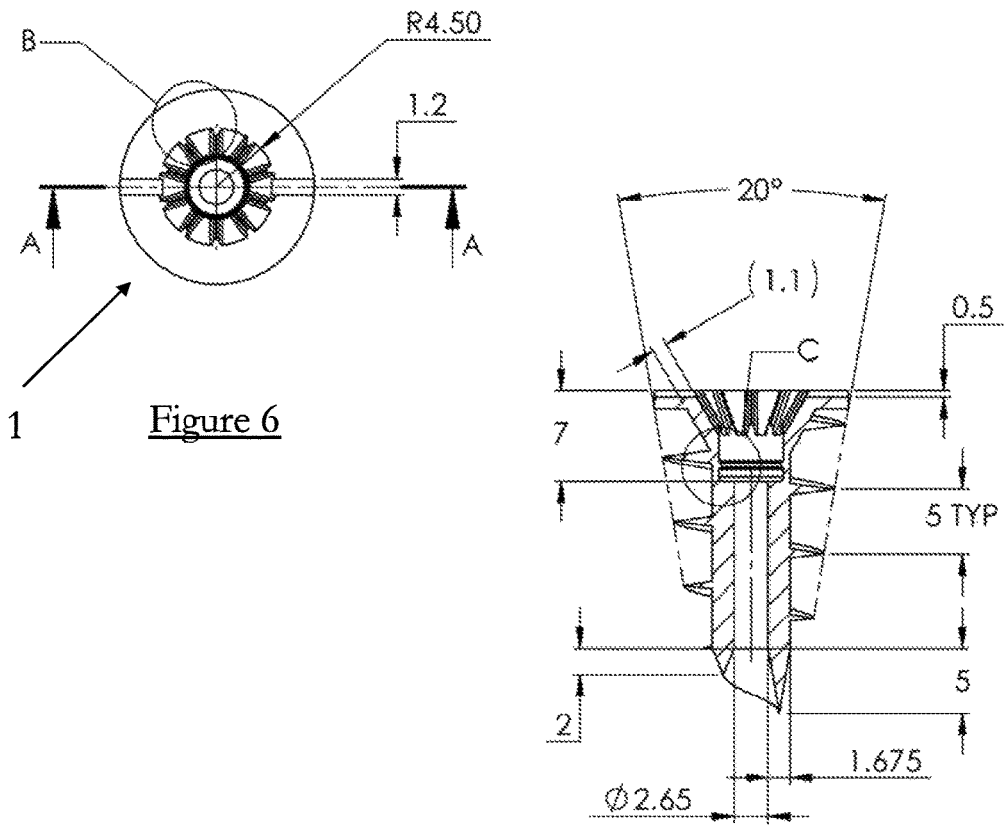
Figure 6
Figure 7
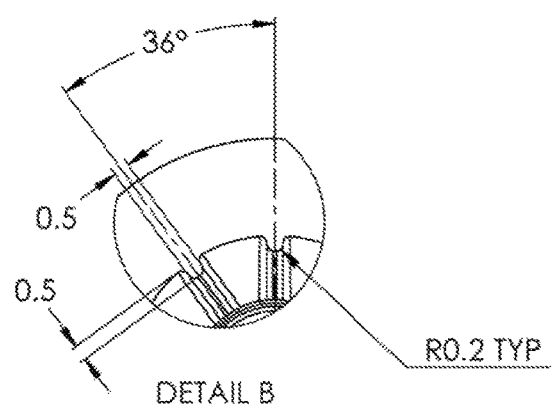
Figure 8

SECTION D-D

SELF-DRILLING DRYWALL ANCHOR AND A METHOD OF SECURING AN ANCHOR IN A DRYWALL

FIELD OF THE INVENTION

The present invention relates generally to a self-drilling drywall anchor and a method of securing an anchor in a drywall and finds particular, although not exclusive, utility in anchoring items to plasterboard walls and ceilings.

BACKGROUND OF THE INVENTION

Conventional self-drilling drywall anchors are known that include a shank having an internal bore extending from a first end of the shank; an external thread provided on the shank; and a screw drive provided at the first end of the shank, the screw drive configured to engage with a tool for applying torque to the shank; wherein the anchor is configured such that applying torque to the shank via the screw drive enables the external thread to cut a helical groove into a drywall panel, thereby securing the anchor in the drywall panel.

However, unexperienced users of such anchors may continue to apply torque to the screw drive, even after the anchor has become fully bedded down in the drywall, under the mistaken impression that applying a greater torque will improve security of the anchor within the drywall, as may for instance be the case when securing a bolt into a nut. However, continuing to rotate the anchor after it has been fully inserted into the dry wall requires a greater torque. This greater torque is sufficient not only to continue to rotate the anchor within the drywall, but to additionally gouge out drywall material from around the anchor. Such gouging causes a cavity to form around the anchor, reducing its security within the wall.

BRIEF SUMMARY OF THE INVENTION

According to a first aspect of the present invention, there is provided a self-drilling drywall anchor, comprising: a shank having an internal bore extending from a first end of the shank substantially to a second end opposing the first end; an external thread provided on the shank; and a screw drive provided at the first end of the shank, the screw drive configured to engage with a tool for applying torque to the shank; wherein the anchor is configured such that applying torque to the shank via the screw drive enables the external thread to cut a helical groove into a drywall panel, thereby securing the anchor in the drywall panel; and wherein the screw drive comprises a clutch configured to limit an amount of torque transmitted to the shank by a tool engaged with the screw drive.

In this way, a user may drive the anchor into a drywall by engaging a mating tool with the screw drive and applying a torque such that the external thread cuts a helical groove into the drywall, but over-tightening is prevented as the clutch limits the amount of torque transmitted to the shank, thereby preventing the external threads on the shank from gouging out drywall material adjacent to the anchor and reducing the anchor's security within the drywall.

The term drywall may refer to plasterboard, wallboard and/or gypsum board, and may refer to a panel made of (e.g. gypsum) plaster, which may be pressed between sheets of paper. Alternatively or additionally, drywall may simply refer to gypsum plaster or plaster of Paris.

The term drywall anchor may refer to an item that can be secured into a drywall and used to hold other items in position relative to the drywall.

The term self-drilling drywall anchor may refer to any form of anchor that when driven into drywall is configured to cut into the drywall (e.g. by slicing off shavings as in twist drills or auger bits, grinding off particles, or crushing and removing pieces of the workpiece as in a masonry drill) to form a cavity in the drywall into which the anchor proceeds.

The term shank may refer to any elongate object having a length that is substantially greater than it diameter or lateral extent, for instance at least one-and-a-half times as long, at least twice as long, or at least three times as long.

The shank may have a cross section that is substantially constant along its length, or may have a cross section that varies along its length, for example by tapering from the first end to the second end. The shank may be substantially the shape of a cone, a truncated cone, or a cylinder.

The internal bore may be configured to receive a fixing device therein, for instance a screw, bolt and/or nail. The internal bore may be internally threaded, such that an external thread of a screw and/or bolt may cooperatively engage therewith. Alternatively, the internal bore may be blind; that is, unthreaded. In this way, an external thread of a screw and/or bolt may cut into the interior wall of the internal bore to secure itself therein.

The internal bore may comprise an axially aligned, central and/or axially symmetric passage between the first and second ends of the shank. The internal bore may have a lateral extent (at right angles to its length) that may vary along its length, or it may have a substantially constant lateral extent. The internal bore may have an internal cross section that is constant or varies along its length, for instance by tapering. The internal bore may be closed at one or both ends, but is preferably open at both ends.

The internal bore may have a circular cross section, or may have a cross-section that is substantially star-shape. For instance, the internal bore may have a cross-section that is substantially circular, but may further comprise a plurality of internal ribs that run, for instance, parallel to the axis of the bore (but could conceivably run around the internal bore helically) thereby forming a star-shape cross section. The ribs may be configured to form an internal thread within the bore such that a fixing device (such as a screw or bolt) may cooperate therewith. An internal bore with a star-shape cross section may comprise an internal thread, or may be blind.

The external thread may comprise a ridge passing substantially helically around an exterior surface of the shank. For instance, for a substantially cylindrical shank the ridge may pass in a substantially circular helix around the exterior surface of the shank, or for a substantially conical shank the ridge may pass in a substantially conical helix around the exterior surface of the shank.

The ridge may have a cross section that is substantially triangular, for instance having a shape substantially similar to that of a (e.g. isosceles) triangle, and/or substantially trapezoidal, for instance having a shape substantially similar to that of a (e.g. isosceles) trapezoid, square or rectangle.

The screw drive may be configured to allow torque to be applied to the anchor by a mating tool such as a screwdriver, spanner, wrench, Allen key, hex key, etc., and may be for instance a slot, cross, Phillips®, PoziDriv®, square, hex, 12-point, or any other known screw drive type.

The screw drive may be arranged such that when it is driven by a mating tool, the anchor is rotated about its axis and driven into the drywall.

The clutch may comprise a torque limiter, slip clutch and/or safety clutch, or any other known form of clutch for limit an amount of torque transmitted to the shank by a mating tool engaged with the screw drive.

The external thread may cut a helical groove into a drywall by slicing off shavings, grinding off particles and/or crushing and removing pieces of the drywall, as discussed above, and/or by moving between adjacent particles of drywall (e.g. by compressing them).

The clutch may be configured to indicate to a user that the amount of torque is being limited, for instance by clicking in a manner well-known in the art.

The bore may be open at the first end, or alternatively the bore may be (at least partially) closed at the first end. The bore may be open at the second end. In this way, screws inserted into the internal bore of the anchor to fasten other items to the drywall will not 'bottom out' on the end of the internal bore.

The anchor may comprise a head at the first end, the head may have a lateral extent, which may be substantially perpendicular to an axis of the shank, that is substantially greater than a diameter of the shank. In this way, the anchor cannot be inserted into the drywall beyond its own depth, as the head prevents movement of the anchor into the hole bored out by the anchor.

The head may comprise at least one hole therethrough, the at least one hole may be substantially spaced from the internal bore, and may extending substantially parallel to the internal bore. The anchor may further comprise a removably insertable locking member, which may be configured to pass through the at least one hole and/or embed into the drywall board into which the anchor is secured. In this way, once the anchor has been driven into the drywall to a predetermined depth, and the clutch thereby limits the torque applied by the user to the shank, a locking member can be inserted that substantially inhibits and/or limits any further rotation of the anchor in the drywall. In this way, a fixing device such as a screw may be driven into the internal bore, and any torque transferred from the fixing device to the anchor (e.g. via the internal bore directly, without being mitigated by the clutch) will not have an effect of further rotating the anchor in the drywall, and thereby gouging out a cavity around the anchor.

According to a second aspect of the present invention, there is provided a method of securing an anchor in a drywall, the method comprising the steps of: providing a self-drilling drywall anchor according to any preceding claim; engaging a tool with the screw drive; applying a torque to the shank with the tool via the screw drive; cutting a helical groove into a drywall panel with the external thread; and limiting an amount of torque transmitted to the shank by the tool engaged with the screw drive to prevent over-tightening of the anchor into the drywall.

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

BRIEF DESCRIPTION OF THE DRAWINGS

FIG. 6 is a top view of the main body of the anchor of FIG. 1.

FIG. 7 is a cross sectional view along line A-A through the main body of FIG. 6.

FIG. 8 is an enlarged view of a portion B of the main body of FIG. 6.

DETAILED DESCRIPTION OF THE INVENTION

Figure 1:
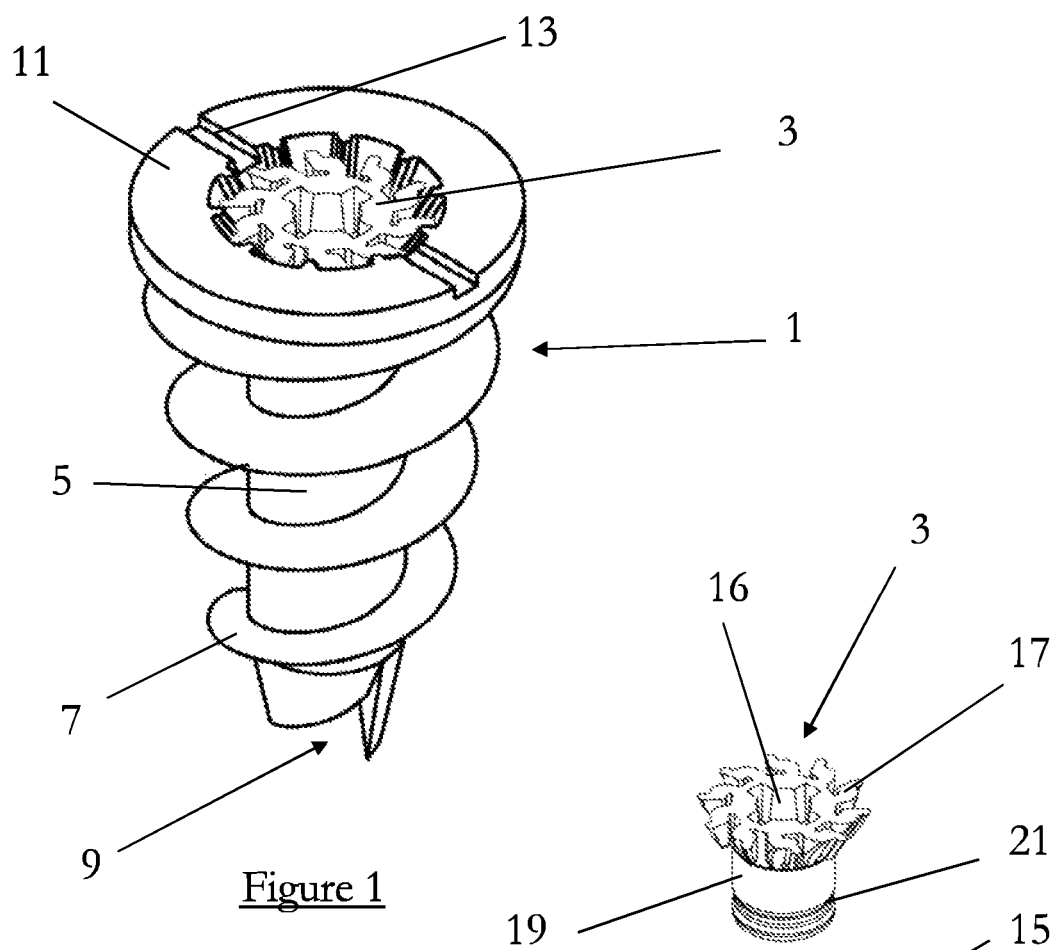
FIG. 1 is a perspective view of a self-drilling drywall anchor.

The present invention will be described with respect to certain drawings but the invention is not limited thereto but only by the claims. The drawings described are only schematic and are non-limiting. Each drawing may not include all of the features of the invention and therefore should not necessarily be considered to be an embodiment of the invention. In the drawings, the size of some of the elements may be exaggerated and not drawn to scale for illustrative purposes. The dimensions and the relative dimensions do not correspond to actual reductions to practice of the invention.

Furthermore, the terms first, second, third and the like in the description and in the claims, are used for distinguishing between similar elements and not necessarily for describing a sequence, either temporally, spatially, in ranking or in any other manner. It is to be understood that the terms so used are interchangeable under appropriate circumstances and that operation is capable in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that operation is capable in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Similarly, it is to be noticed that the term "connected", used in the description, should not be interpreted as being restricted to direct connections only. Thus, the scope of the expression "a device A connected to a device B" should not be limited to devices or systems wherein a torque output of device A is directly connected to an input of device B. It means that there exists a path between an output of A and an input of B which may be a path including other devices or means. "Connected" may mean that two or more elements are either in direct physical contact, or that two or more elements are not in direct contact with each other but yet still co-operate or interact with each other.

Reference throughout this specification to "an embodiment" or "an aspect" means that a particular feature, structure or characteristic described in connection with the embodiment or aspect is included in at least one embodiment or aspect of the present invention. Thus, appearances of the phrases "in one embodiment", "in an embodiment", or "in an aspect" in various places throughout this specification are not necessarily all referring to the same embodiment or aspect, but may refer to different embodiments or aspects. Furthermore, the particular features, structures or characteristics of any embodiment or aspect of the invention may be combined in any suitable manner, as would be apparent to one of ordinary skill in the art from this disclosure, in one or more embodiments or aspects.

Similarly, it should be appreciated that in the description various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Moreover, the description of any individual drawing or aspect should not necessarily be considered to be an embodiment of the invention. Rather, as the following claims reflect, inventive aspects lie in fewer than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some features included in other embodiments, combinations of features of different embodiments are meant to be within the scope of the invention, and form yet further embodiments, as will be understood by those skilled in the art. For example, in the following claims, any of the claimed embodiments can be used in any combination.

In the description provided herein, numerous specific details are set forth. However, it is understood that embodiments of the invention may be practised without these specific details. In other instances, well-known methods, structures and techniques have not been shown in detail in order not to obscure an understanding of this description.

In the discussion of the invention, unless stated to the contrary, the disclosure of alternative values for the upper or lower limit of the permitted range of a parameter, coupled with an indication that one of said values is more highly preferred than the other, is to be construed as an implied statement that each intermediate value of said parameter, lying between the more preferred and the less preferred of said alternatives, is itself preferred to said less preferred value and also to each value lying between said less preferred value and said intermediate value.

The use of the term "at least one" may mean only one in certain circumstances.

The principles of the invention will now be described by a detailed description of at least one drawing relating to exemplary features of the invention. It is clear that other arrangements can be configured according to the knowledge of persons skilled in the art without departing from the underlying concept or technical teaching of the invention, the invention being limited only by the terms of the appended claims.

FIG. 1 is a perspective view of a self-drilling drywall anchor that comprises a main body 1 and a clutch insert 3.

The main body 1 comprises a shank 5 around which is wound an external thread 7 for cutting into gypsum plaster. The lower end of the shank 5 is open to it internal bore 9, and has been shaped such that it may cut into gypsum plaster and may form a pilot hole into which the thread 7 may bite.

At an upper end of the shank 5 is provided a substantially circular head 11 (although other shapes, such as hexagonal, are also possible). Into the head 11 is formed a slot 13 for receiving a slot screw driver (not shown) such that the main body 1 may be driven into a surface. This feature is optional, and may comprise any number of shapes other than a simple slot 13; for instance, the shape of the head 11 may comprise an external screw drive, such as a hexagonal shape, as mentioned above).

The clutch body 3 is recessed within the internal bore below the extent of the slot 13 such that presence or absence of the clutch body 3 does not interfere with operation of the slot 13 as an internal screw drive.

Figure 2:
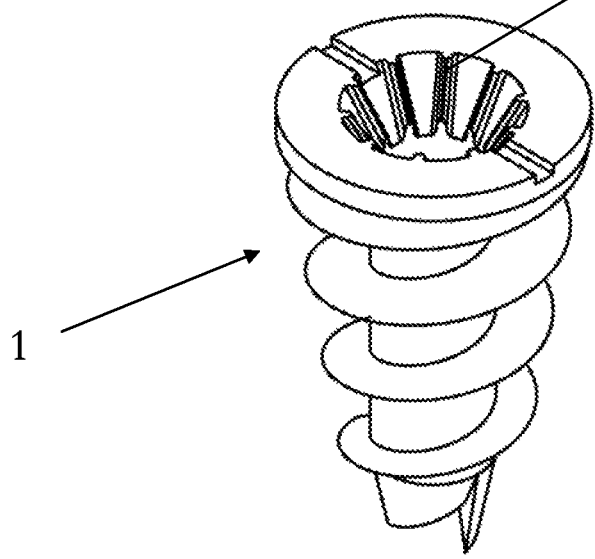
FIG. 2 is an exploded perspective view of the self-drilling drywall anchor of FIG. 1.

FIG. 2 is an exploded perspective view of the self-drilling drywall anchor of FIG. 1 showing the clutch body 3 removed from the main body 1. The upper end of the internal bore is flared, and comprises ten ridges 15 spaced at equal angles around the perimeter of the internal bore, and projecting in towards the axis of the internal bore. The flaring of the internal bore assists in disassembly of the clutch body 3 from the main body 1, by allowing a tool (such as a flat head screw driver) to be inserted under the clutch body 3 to prise it out.

The clutch body 3 comprises a clutch screw drive 16 disposed on an axial upper surface thereof. The clutch screw drive 16 shown is substantially cross-shape in order to prevent confusion with the slot 13 in the main body 1. The clutch body 3 comprises ten arms 17 projecting radially outwards from the axis of the clutch body 3, and configured to engage the ridges 15 on the main body 1. Each arm 17 is configured to be flexible, such that below some predetermined/predefined torque applied via the clutch screw drive 16, the arms 17 engage with the ridges 15 to transfer the torque to the main body 1, thereby allowing the shank to be driven into gypsum plaster. The degree of flexibility in each arm 17 is also chosen such that above the predetermined/predefined threshold torque applied via the clutch screw drive 16, the arms 17 flex passed the ridges 15, thereby preventing most if not all of the applied torque from being transferred to the main body 1.

The clutch body 3 also comprises a cylindrical barrel 19 configured to sit inside the internal bore of the main body 1. An annular channel 21 circumscribes the barrel 19 and is configured to cooperate with an annular ridge 23 shown in FIG. 9 inside the internal bore of the main body 1 to prevent accidental removal of the clutch body 3 from the main body 1.

Figure 3:
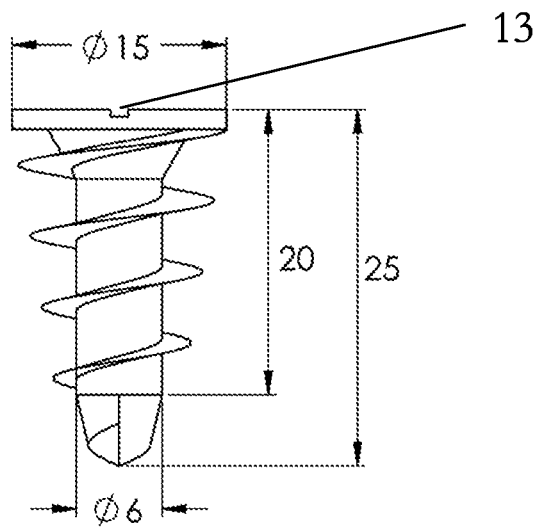
FIG. 3 is a side view of the anchor of FIG. 1.

FIG. 3 is a side view of the anchor of FIG. 1 looking along the slot 13 and shows some preferred dimensions in mm of the anchor; however, other sizes are also considered, for instance keeping the current proportions, merely increasing some proportions but not others, or changing proportions entirely.

Figure 4:
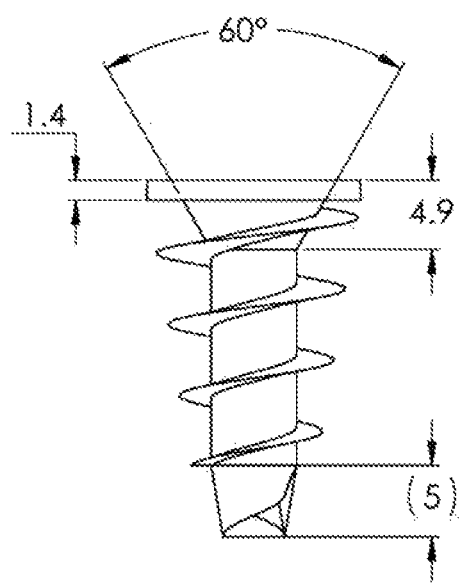
FIG. 4 is an alternative side view of the anchor of FIG. 1.

FIG. 4 is an alternative side view of the anchor of FIG. 1 looking across the slot shown in FIGS. 1, 2 and 3, again showing some preferred dimensions in mm.

Figure 5:
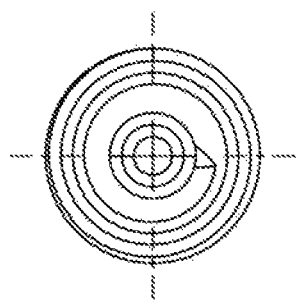
FIG. 5 is an underside view of the anchor of FIG. 1.

FIG. 5 is an underside view of the anchor of FIG. 1.

FIG. 6 is a top view of the main body 1 of the anchor of FIG. 1, with the clutch body removed, again showing some preferred dimensions in mm.

FIG. 7 is a cross sectional view along line A-A of FIG. 6, once again showing some preferred dimensions in mm.

FIG. 8 is an enlarged view of a portion B of FIG. 6 showing some further preferred dimensions in mm.

Figure 9:
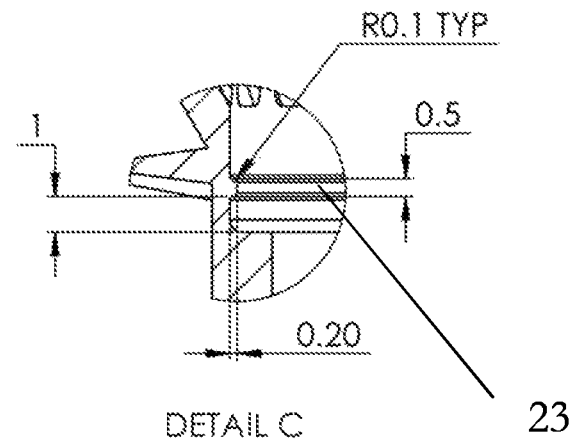
FIG. 9 is an enlarged view of a portion C of the cross section of the main body of FIG. 7.

FIG. 9 is an enlarged view of a portion C of FIG. 7 showing the annular ridge 23 within the internal bore that cooperates with the annular channel on the clutch body 21 shown in FIG. 2.

Figure 10:
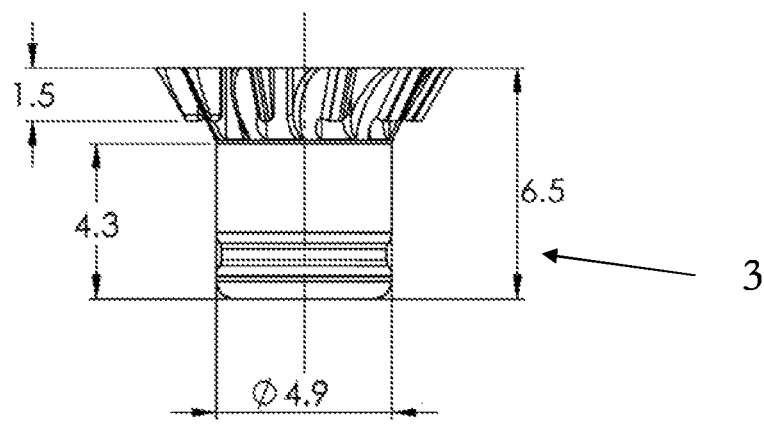
FIG. 10 is a side view of the clutch body of the anchor of FIG. 1.

FIG. 10 is a side view of the clutch body 3 of the anchor of FIG. 1 showing some preferred dimensions in mm.

Figure 11:
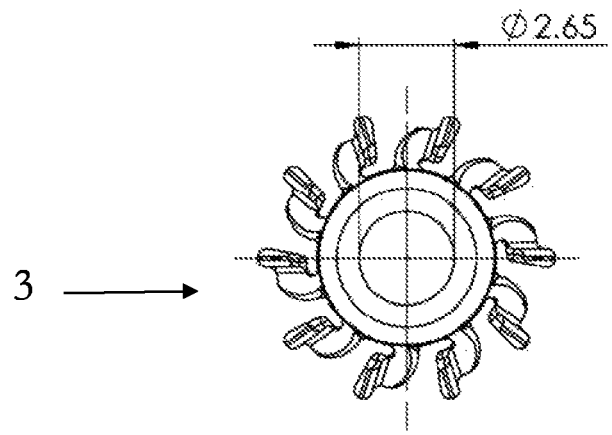
FIG. 11 is an underside view of the clutch body of FIG. 10.

FIG. 11 is an underside view of the clutch body 3 of FIG. 10, again showing some preferred dimensions in mm.

Figure 12:
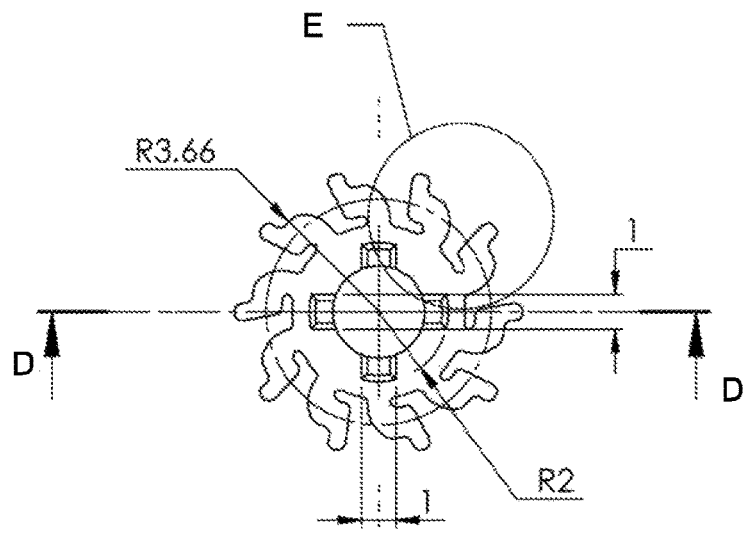
FIG. 12 is a top view of the clutch body of FIG. 10.

FIG. 12 is a top view of the clutch body of FIG. 10, showing some further preferred dimensions in mm.

Figure 13:
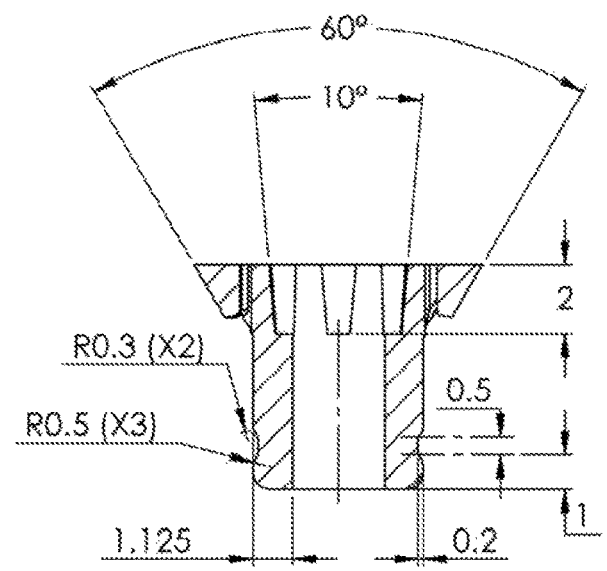
FIG. 13 is a cross sectional view along line D-D through the clutch body of FIG. 12.

FIG. 13 is a cross sectional view along line D-D of FIG. 12, showing some still further preferred dimensions in mm.

Figure 14:
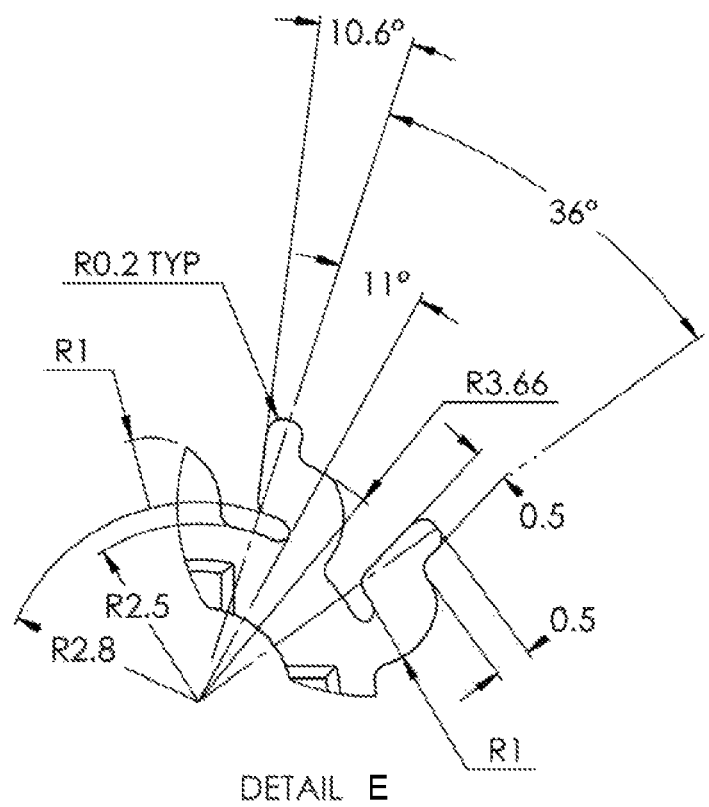
FIG. 14 is an enlarged view of a portion E of the clutch body of FIG. 12.

FIG. 14 is an enlarged view of a portion E of FIG. 12, again showing some further preferred dimensions in mm.

Figure 15:
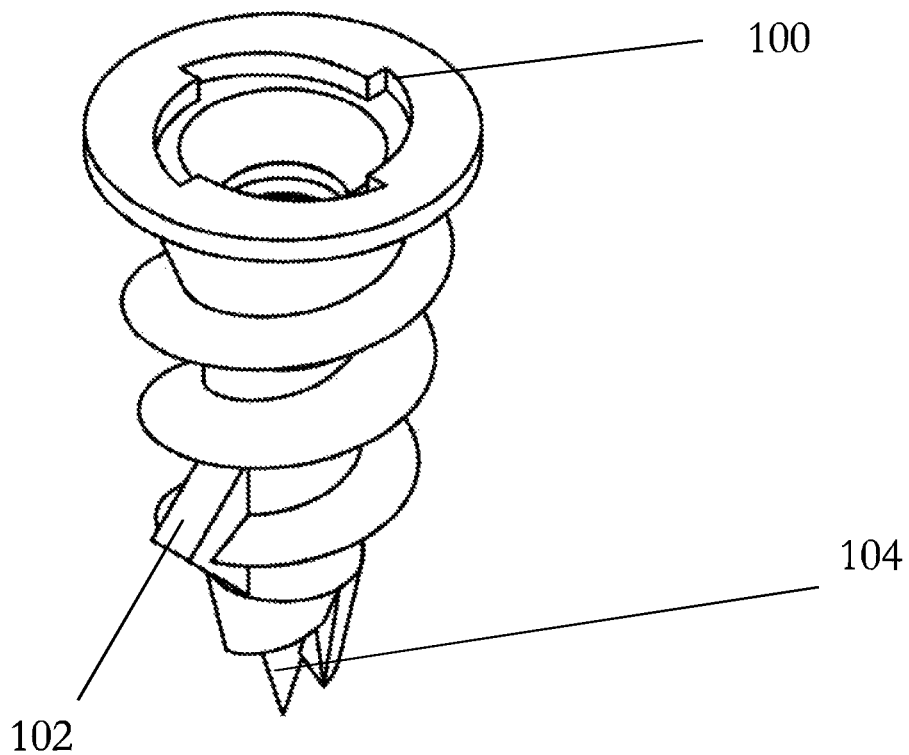
FIG. 15 is a top perspective view of an alternative self-drilling drywall anchor.

FIG. 15 is a top perspective view of an alternative self-drilling drywall anchor, which differs from that shown in FIG. 1 in three ways. First, instead of the ridges 15 shown in FIG. 1, the anchor has four stepped stops 100 spaced at equal angles around the perimeter of the internal bore. A corresponding clutch body, shaped for engagement with these stops 100 is envisaged, but not shown, for clarity.

Secondly, two opposed angled arms 102 project from the shank of the anchor, diametrically opposite one another, and extending outside the extend of the thread on the shank. These act to gouge out a hole around the anchor, so that the helical thread can more easily draw the anchor into the plasterboard, thereby reducing stress on the clutch body (not shown) when the anchor is being driven into the plasterboard.

Thirdly, instead of an open tip, the anchor is provided with a pointed tip of reduced diameter (compared to the shank), to assist in locating/centering the anchor on the surface into which it is to be drilled.

Figure 16:
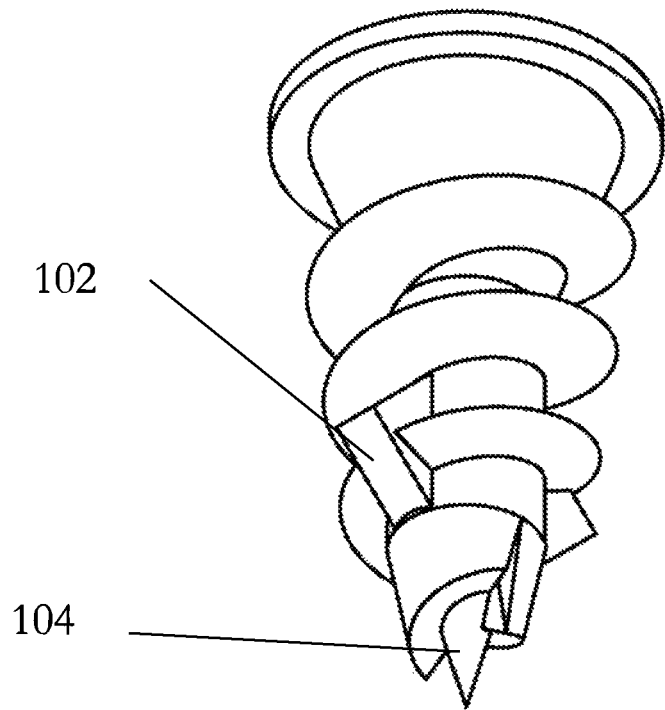
FIG. 16 is an underside perspective view of the alternative anchor of FIG. 15.

FIG. 16 is an underside perspective view of the alternative anchor of FIG. 15.

What is claimed is:

1. A self-drilling drywall anchor, comprising:
   a shank having an internal bore extending from a first end of the shank substantially to a second end opposing the first end, formed in the internal bore at the first end of the shank are a plurality of ridges spaced at equal angles around a perimeter of the internal bore, the plurality of ridges projecting in towards an axis of the internal bore;
   a clutch body disposed within the internal bore at the first end of the shank, the clutch body comprising a central hub from which a plurality of arms project radially outwards from the axis of the internal bore, each of the plurality of arms comprising a radial portion connected to the hub via a curved portion such that flexure of the curved portion about the axis of the internal bore in a first rotational direction results in the radial portion moving radially outward and flexure of the arms about the axis of the internal bore in a second rotational direction results in the radial portion moving radially inward, the radial portion of each arm configured to engage a respective one of the plurality of ridges;
   an external thread provided on the shank; and
   a screw drive provided on the clutch body, the screw drive configured to engage with a tool for applying torque to the shank;
   wherein the anchor is configured such that applying torque to the shank via the screw drive enables the external thread to cut a helical groove into a drywall panel, thereby securing the anchor in the drywall panel; and
   wherein the plurality of arms is configured to be flexible such that:
      a first torque applied by a tool engaged with the screw drive in the first rotational direction results in the plurality of arms engaging with the plurality of ridges to transfer the first torque to the shank for any magnitude of the first torque, thereby allowing the shank to be removed from a surface;
      a second torque applied by a tool engaged with the screw drive in the second rotational direction, the second torque being below a predefined threshold torque, results in the plurality of arms engaging with the plurality of ridges to transfer the torque to the shank thereby allowing the shank to be driven into a surface; and
      a third torque applied by a tool engaged with the screw drive in the second rotational direction, the second torque being above the predefined threshold torque, results in the plurality of arms flexing passed the plurality of ridges thereby preventing the torque applied by the tool engaged with the screw drive from being transferred to the shank.

2. The self-drilling drywall anchor of claim 1, wherein the bore is open at the second end.

3. The self-drilling drywall anchor of claim 1, wherein the anchor further comprises a head at the first end.

4. The self-drilling drywall anchor of claim 3, wherein:
   the head comprises at least one hole therethrough, the at least one hole substantially spaced from the internal bore, and extending substantially parallel to the internal bore; and
   the anchor further comprises a removably insertable locking member configured to pass through the at least one hole to embed into the drywall board into which the anchor is secured.

5. A method of securing an anchor in a drywall, the method comprising the steps of:
   providing a self-drilling drywall anchor according to claim 1;
   engaging a tool with the screw drive;
   applying a torque to the shank with the tool via the screw drive;
   cutting a helical groove into a drywall panel with the external thread; and
   limiting an amount of torque transmitted to the shank by the tool engaged with the screw drive to prevent over-tightening of the anchor into the drywall.

* * * * *